(12) United States Patent
Krusemark et al.

(10) Patent No.: US 8,770,032 B2
(45) Date of Patent: Jul. 8, 2014

(54) RELATIVE PRESSURE SENSOR

(75) Inventors: Olaf Krusemark, Kassel (DE); Norbert Gill, Vellmar (DE)

(73) Assignee: Endress + Hauser GmbH +Co. KG, Maulburg (DE)

( * ) Notice: Subject to any disclaimer, the term of this patent is extended or adjusted under 35 U.S.C. 154(b) by 289 days.

(21) Appl. No.: 13/389,855

(22) PCT Filed: Jul. 21, 2010

(86) PCT No.: PCT/EP2010/060516
§ 371 (c)(1),
(2), (4) Date: Feb. 10, 2012

(87) PCT Pub. No.: WO2011/018311
PCT Pub. Date: Feb. 17, 2011

(65) Prior Publication Data
US 2012/0137784 A1  Jun. 7, 2012

(30) Foreign Application Priority Data
Aug. 12, 2009  (DE) .......................... 10 2009 028 488

(51) Int. Cl.
*G01L 7/00* (2006.01)
*G01L 19/06* (2006.01)
*G01L 19/14* (2006.01)

(52) U.S. Cl.
CPC ............ *G01L 19/148* (2013.01); *G01L 19/0645* (2013.01); *G01L 19/0654* (2013.01); *G01L 19/146* (2013.01); *G01L 19/141* (2013.01)
USPC ....................................................... 73/706

(58) Field of Classification Search
None
See application file for complete search history.

(56) References Cited

U.S. PATENT DOCUMENTS 4,626,664 A  12/1986  Grise
5,551,303 A   9/1996  Donner
(Continued)

FOREIGN PATENT DOCUMENTS

CN  1149931 A  5/1997
DE  4231120 C2  3/1994
(Continued)

OTHER PUBLICATIONS

International search report
(Continued)

*Primary Examiner* — Andre Allen
(74) *Attorney, Agent, or Firm* — Bacon & Thomas, PLLC

(57) ABSTRACT

A relative pressure sensor includes: a pressure measuring transducer having a measuring membrane of a semiconductor chip and a platform, wherein, between both of these, a reference pressure chamber is formed; a support body, connected with the platform by means of a pressure-bearing adhesion, wherein a reference pressure path extends through the two former elements into the reference pressure chamber; and a sensor outer body, in which a transducer chamber with a first opening and a second opening is formed. The pressure measuring transducer is brought into the transducer chamber through the first opening, and is held therein by means of the support body. The support body pressure-tightly seals the first opening, and a side of the measuring membrane facing away from the reference pressure chamber is contactable with the media pressure through the second opening. The reference pressure path has a gas-filled, sealed section, which extends from the reference pressure chamber at least through the pressure bearing adhesion, and wherein the sealed section is gas-tightly sealed by means of a flexible, metallized plastic foil.

9 Claims, 3 Drawing Sheets

(56) References Cited

U.S. PATENT DOCUMENTS

| | | | |
|---|---|---|---|
| 5,889,211 A | 3/1999 | Maudie | |
| 6,425,291 B1 * | 7/2002 | Flogel | 73/729.1 |
| 8,490,494 B2 * | 7/2013 | Parrotto et al. | 73/706 |
| 2006/0169047 A1 | 8/2006 | Dannhauer | |
| 2011/0209552 A1 * | 9/2011 | Tham et al. | 73/702 |

FOREIGN PATENT DOCUMENTS

| | | | |
|---|---|---|---|
| DE | 10134360 A1 | | 2/2003 |
| EP | 0524550 A1 * | | 1/1993 |
| EP | 0658754 B1 | | 6/1995 |
| EP | 0736757 A1 | | 10/1996 |
| EP | 1065488 A1 | | 1/2001 |
| EP | 1070948 A1 | | 1/2001 |
| WO | 8602228 | | 4/1986 |
| WO | WO 2004/042338 A1 | | 5/2004 |
| WO | WO 2011124418 A1 * | | 10/2011 |

OTHER PUBLICATIONS

German Search Report
English translation of the IPR.

* cited by examiner

RELATIVE PRESSURE SENSOR

TECHNICAL FIELD

The present invention relates to a relative pressure sensor for registering the difference between a media pressure and atmospheric pressure.

BACKGROUND DISCUSSION

A relative pressure sensor of the field of the invention includes a pressure measuring transducer, wherein the pressure measuring transducer has a measuring membrane and a platform, wherein, between the measuring membrane and the platform, a reference pressure chamber is formed, a support body, wherein the platform is connected with the support body by means of a pressure-bearing adhesion, wherein a reference pressure path extends through the platform and the support body, in order to introduce reference pressure into the reference pressure chamber, a sensor outer body, in which a transducer chamber is formed, wherein the transducer chamber has a first opening and a second opening, wherein the pressure measuring transducer is brought into the transducer chamber through the first opening, and is held in the transducer chamber by means of the support body, wherein the support body pressure-tightly seals the first opening, and wherein a side of the measuring membrane facing away from the reference pressure chamber is contactable with the media pressure via the second opening.

In the case of the relative pressure sensors of the field of the invention, the problem arises that the pressure-bearing adhesion is moisture sensitive. This leads to mechanical stresses in the pressure measuring transducer, which ultimately cause measurement errors. In this regard, German patent application 102008043175 describes approaches to change the topology of the pressure-bearing adhesion, through which, in the case of the pressure sensor of the invention, the reference pressure path extends, in such a manner that the pressure-bearing adhesion is protected from the reference air by a moisture barrier.

Although these approaches effect an improvement, they are not fundamental solutions, since these types of barriers— for example, a silicone layer on the adhesion or a rubber hose between the adhesion and reference air path—are not hermetically sealed, and thus the ratio of effort required to improvement achieved still leaves a good deal to be desired.

European patent application EP 1065488A1 discloses a capacitive, ceramic, relative pressure sensor including: A gas-filled measuring chamber, which is sealed with a ceramic measuring membrane, on whose outside pressure to be measured acts during operation; a gas filled, compressible, resilient bellows, on which a reference pressure acts externally during operation, and whose internal volume depends on its reference pressure, and which, for matching an internal pressure reigning in the measuring chamber to the reference pressure, communicates with the measuring chamber; and a transducer for conversion of a pressure-dependent deformation of the measuring membrane into an electrical, measured variable. In the detailed description, it is disclosed that the resilient bellows can especially have metal membranes, for example, wave membranes or resilient plastic membranes, wherein, here, the elasticity clearly plays a large role. Thus, elasticity means the presence of a return force, which absolutely unavoidably leads to a corrupted reference pressure, and therewith to measurement error.

SUMMARY OF THE INVENTION

An object of the present invention is consequently to provide a relative pressure sensor, which overcomes the disadvantages of the state of the art, and which, without degrading the accuracy of measurement, assures a reliable moisture protection for the adhesion of the platform on the support body.

The object is achieved according to the invention by the relative pressure sensor which comprises: a pressure measuring transducer, wherein the pressure measuring transducer has a measuring membrane and a platform, wherein, between the measuring membrane and the platform, a reference pressure chamber is formed; a support body, wherein the platform is connected with the support body by means of a pressure-bearing adhesion, wherein a reference pressure path extends through the platform and the support body, in order to introduce reference pressure into the reference pressure chamber; a sensor outer body, in which a transducer chamber is formed, wherein the transducer chamber has a first opening and a second opening, wherein the pressure measuring transducer is brought into the transducer chamber through the first opening and is held in the transducer chamber by means of the support body, wherein the support body pressure-tightly seals the first opening, and wherein a side of the measuring membrane facing away from the reference pressure chamber is contactable with the media pressure through the second opening; characterized in that the reference pressure path has a gas-filled, sealed section, which extends from the reference pressure chamber at least through the pressure-bearing adhesion, wherein the sealed section is gas-tightly sealed by means of a flexible, metallized plastic foil.

In a further development of the invention, the gas-filled, sealed section extends at least through the support body.

In an embodiment of this further development of the invention, the gas-filled, sealed section includes a small tube, which is secured to the support body.

The plastic foil can, for example, be gas-tightly connected with the small tube along a peripheral sealing surface, wherein the peripheral sealing surface surrounds an area, which is larger than the cross sectional area of the small tube.

In this regard, the small tube can, for example, have on its end facing away from the reference pressure chamber an end surface, whose surface normals are tilted in comparison to the longitudinal axis of the small tube, in order to achieve a larger area, or a shape-retaining foil bearing body can connect to the small tube, wherein, the gas-filled, sealed section of the reference pressure path extends through this foil bearing body, wherein the plastic foil is gas-tightly connected with the foil bearing body along a peripheral sealing surface, wherein the peripheral sealing surface surrounds an area, which is larger than the cross sectional area of the small tube.

The connection of the foil with the small tube or with the foil bearing body can be formed, for example, via adhesive, welding, crimping or via clamping between the small tube or the foil bearing body and a clamping body with an annular clamping surface.

The pressure of the gas in the sealed, gas-filled section of the reference pressure path should in the ideal case be equal to atmospheric pressure, which acts on the foil on its outside. This means that volume fluctuations of the enclosed gas of the flexible foil should be absorbed. The volume fluctuations of the enclosed gas are caused by its temperature fluctuations and by fluctuations of atmospheric pressure, and are essentially proportional to the amount of enclosed gas. The amount of enclosed gas should, for example, be selected in such a manner that in the case of an average temperature and an average atmospheric pressure, the foil is held in a middle position. The amount of gas is therewith predetermined by the volume of the sealed section of the reference pressure path in the case of the middle position of the foil. In this respect, it is necessary to minimize the volume of the sealed section, if the maximum stroke of the foil should be limited to a minimum amount.

In an embodiment of the invention, the first opening of the transducer chamber has an inner cross sectional area $A_1$, through which the measuring membrane is brought into the transducer chamber, wherein the sealed section of the reference pressure path has between the measuring membrane and the foil a length L, wherein: $L/(A_1/\pi)^{1/2}<4$, preferably $L/(A_1/\pi)^{1/2}<3$. In this way, the volume of the sealed section from extension perpendicular to the plane of the opening is limited.

In an embodiment of the invention, the first opening of the transducer chamber has an inner cross sectional area $A_1$, wherein the perpendicular projection of the foil on the cross sectional area $A_1$ forms a projection surface $A_2$, wherein: $A_2/A_1<1$, especially $A_2/A_1<0.9$ preferably $A_2/A_1<0.8$. In the case of this dimensioning, an option is to run electrical feedthroughs out from the transducer chamber around the foil, wherein these electrical feedthroughs surround the reference pressure path.

According to an embodiment of the invention, the pressure measuring transducer can be a (piezo-)resistive pressure measuring transducer having at least two resistance elements or a capacitive pressure measuring transducer having at least two electrodes, wherein the relative pressure sensor furthermore has an electronic circuit, whose inputs are connected to the resistance elements or to the electrodes of the pressure measuring transducer, wherein the sealed section of the reference pressure path is spatially arranged between the pressure measuring transducer and the electronic circuit.

In connection with the present invention, the terminology "pressure bearing" refers to the property that those forces, which, due to a pressure loading of the pressure measuring transducer in the transducer chamber, act on the adhesion, lead to practically no irreversible deformations of the adhesion, which could have an effect on the zero-point and the measuring range of the sensor.

In the pressure loading of the pressure measuring transducer, the shear stress in the adhesion should be, for example, no more than E/500, preferably no more than E/1000, wherein E is the modulus of elasticity the of material used for the adhesion.

It is clear that three variables enter into the actually occurring shear stress, namely first of all the properties of the material, secondly, the effective area of the adhesion, and thirdly, the applied pressure, or the specified maximum pressure.

As material for the adhesion, especially epoxide adhesives with moduli of elasticity of, for example, 2 GPa to 4 GPa are suitable.

The effective area of the adhesion is, in a further development of the invention, reduced in comparison to the base of the platform, in order to in this way to provide a narrowing, or bottlenecking, between platform and support body. The narrowing effects that mechanical stresses in the platform due to different coefficients of thermal expansion of platform and support body are reduced in comparison to an embodiment with an adhesion across the entire base surface of the platform. In a further development of the invention, the area enclosed by the perimeter of the adhesion amounts to no more than 18%, preferably no more than 12%, and more preferably no more than 6% of the base surface of the platform.

BRIEF DESCRIPTION OF THE DRAWINGS

The invention will now be explained in greater detail on the basis of the appended drawing, the figures of which show as follows.

DETAILED DISCUSSION IN CONJUCTION WITH THE DRAWINGS

Figure 1:
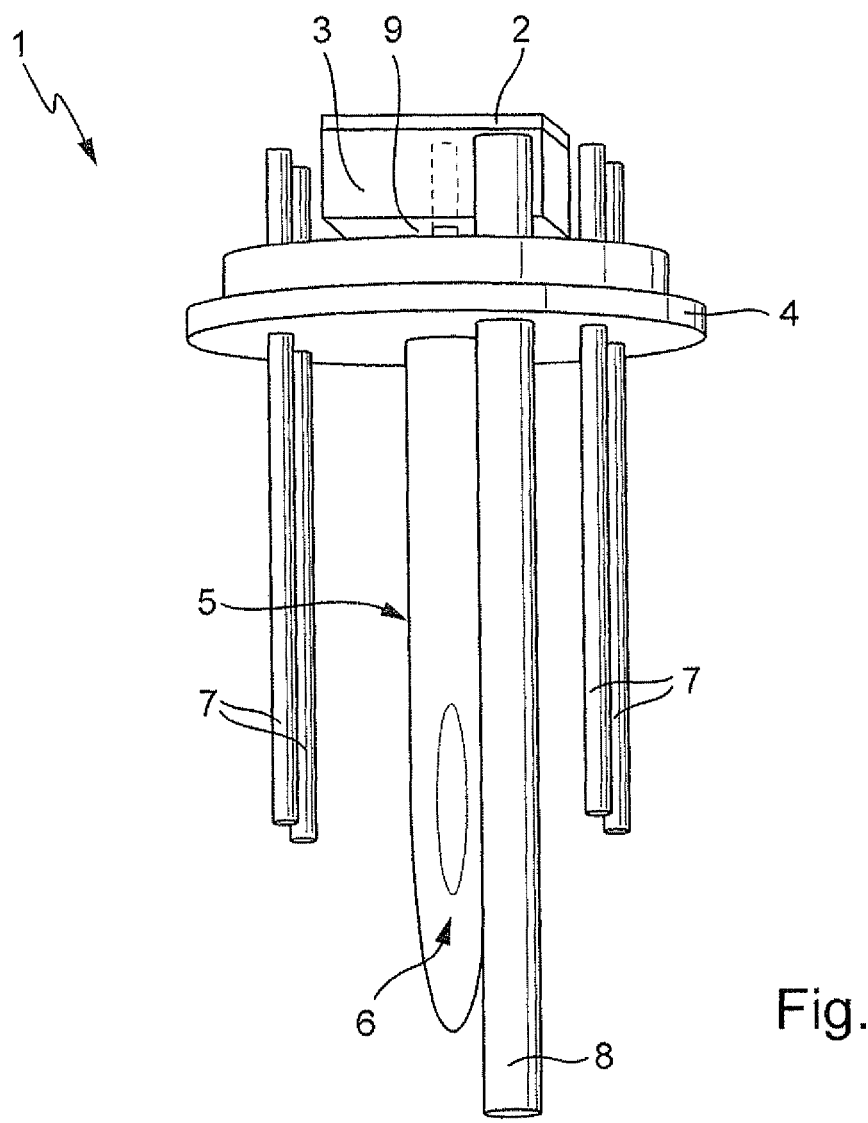
FIG. 1 is a perspective representation of a first example of an embodiment of a pressure measuring transducer of the invention.

The pressure measuring transducer 1 shown in FIG. 1 includes a silicon chip 2 with a measuring membrane, which is secured by means of anodic bonding to an essentially cuboid-shaped platform 3, which comprises a borosilicate glass (Pyrex), and which is traversed by a reference pressure bore. Platform 3 is secured on a plate-shaped support body 4 by means of a ring shaped pressure-bearing adhesion 9. Connected to the support body 4 is a reference air tube 5, which aligns with a central bore through the support body 4, through the pressure-bearing adhesion 9, and with the reference pressure bore through the platform 3. The reference pressure tube 5 has an inclined, end surface 6, on whose edge a metallized plastic foil (not shown) is secured, in order to pressure-tightly seal the reference pressure path through the reference tube 5. The sealed section of the reference pressure path formed in such a way extends from the metallized plastic foil to underneath the measuring membrane of the semiconductor chip 2, wherein the sealed section extends through the reference pressure tube 5, the bore through the support plate 4, the annular pressure bearing adhesion 9 between the support body 4 and the platform 3, and the reference pressure bore through the platform 3 into a reference pressure chamber under the measuring membrane of the semiconductor chip 2. Arranged on a periphery of the support body 4 around the reference pressure tube 5 are electrical feedthroughs 7, in order to contact piezoresistive resistance elements (not shown here) of the semiconductor chip 2 by means of bond wires between the electrical feedthroughs 7 and the semiconductor chip 2.

Furthermore, extending through the support body 4 is a filling tube 8, through which, after installation of the pressure measuring transducer in the transducer chamber of a housing, the transducer chamber can be filled with a hydraulic, pressure transfer liquid.

Due to the inclined cut of the area 6 of the reference pressure tube 5, the end surface on which the metallized foil is secured is larger than in the case of a straight cut of the reference pressure tube 5. This enables a greater volume stroke of the foil, in order to equalize volume fluctuations of the gas enclosed in the reference pressure path. The volume of the sealed part of the reference pressure path can lie, for example, between 5 µl and 20 µl, so that in the case of a volume fluctuation of ±25%, the metallized plastic foil must absorb a volume stroke of ±1.25 microliters to ±5 µl. This is readily possible, especially when the foil has an impressed wave pattern, in order to enlarge the available volume stroke.

Figure 2:
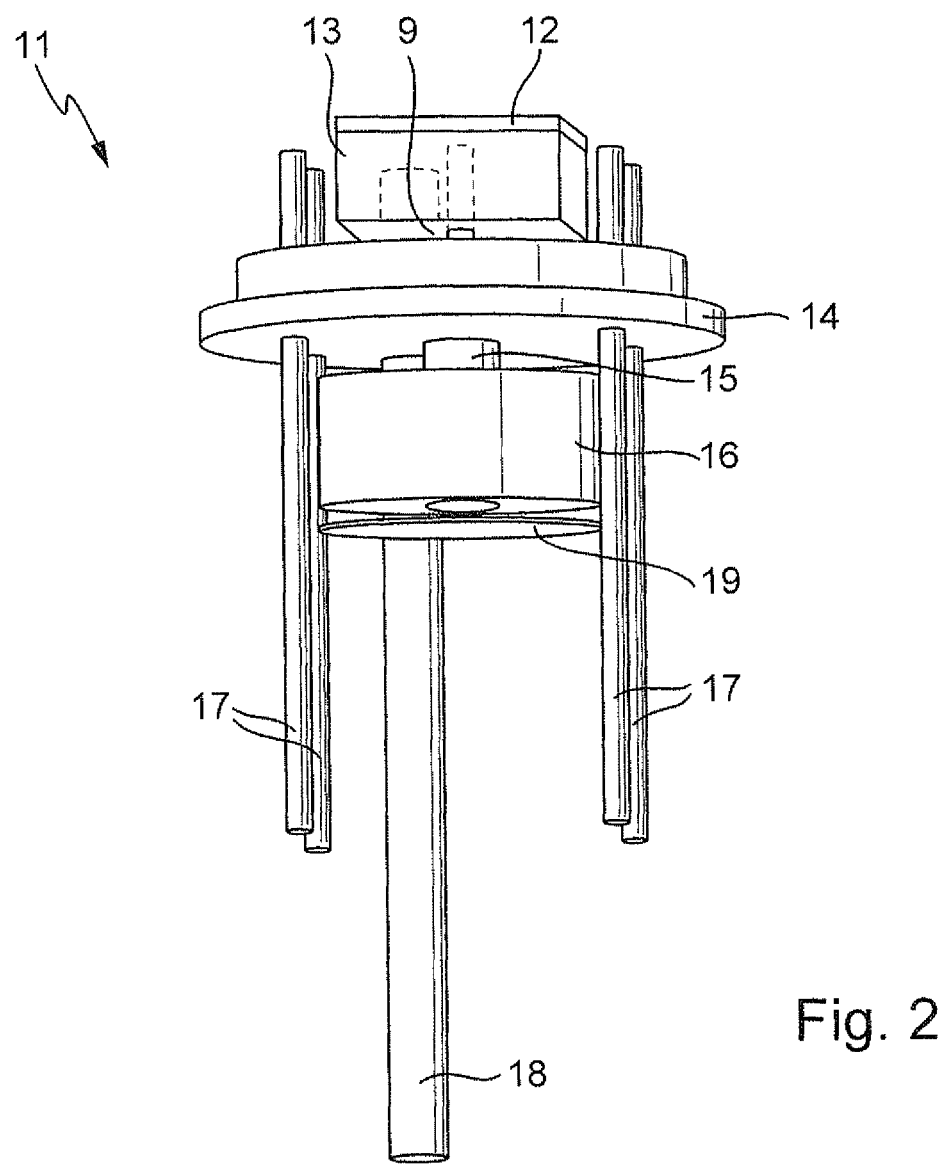
FIG. 2 is a perspective representation of a second example of an embodiment of a pressure measuring transducer of the invention.

FIG. 2 shows a pressure measuring transducer 11, in the case of which a semiconductor chip 12 is secured on a platform 13 by means of anodic bonding. The platform 13 is secured by means of an annular pressure-bearing adhesion 9 on a support body 14, wherein through the platform 13, the pressure bearing adhesion and a central bore through the support body 14 aligning therewith, a reference pressure path extends, which is continued in a reference pressure tube 15, which is secured to the support body 14. Mounted on the reference pressure tube 15 is a foil bearing body 16, through which the reference pressure path continues. The foil bearing body 16 has essentially a cylindrical shape, wherein its radius is selected in such a manner that foil bearing body 16 fits between electrical feedthroughs 17, which are arranged on a circular arc around the center of the support body 14 and extend through this. Extending furthermore through the support body 14 is a filling tube 18, in order, after installation of the pressure measuring transducer in the transducer chamber of a relative pressure sensor, to allow the transducer chamber to be filled with a hydraulic, pressure transfer liquid. On an end face of the foil support body 16 facing away from the reference pressure tube 15, a metallized plastic foil 19 is pressure-tightly secured along a peripheral weld seam, in order to pressure-tightly seal a section of the reference pressure path. The foil bearing body 16 has a larger radius than the reference pressure tube 15, and thus enables a greater volume stroke than if the foil were directly secured on the reference pressure tube 15. In any case, the volume stroke of the metallized plastic foil 19, in given cases provided with a wave pattern, is sufficient for equalizing volume fluctuations of some µl about the equilibrium position of the foil. The shown compact construction of the pressure measuring transducer with the positioning of the sealed section of the reference pressure path still in the region of the electrical feedthroughs enables this invention to be implemented without greater adaptive effort, since, for example, the foil bearing body 16 and the metallized foil 19 can be emplaced between the support body 14 and a preprocessing circuit (not shown here), which adjoins the electrical feedthroughs 17.

Figure 3:
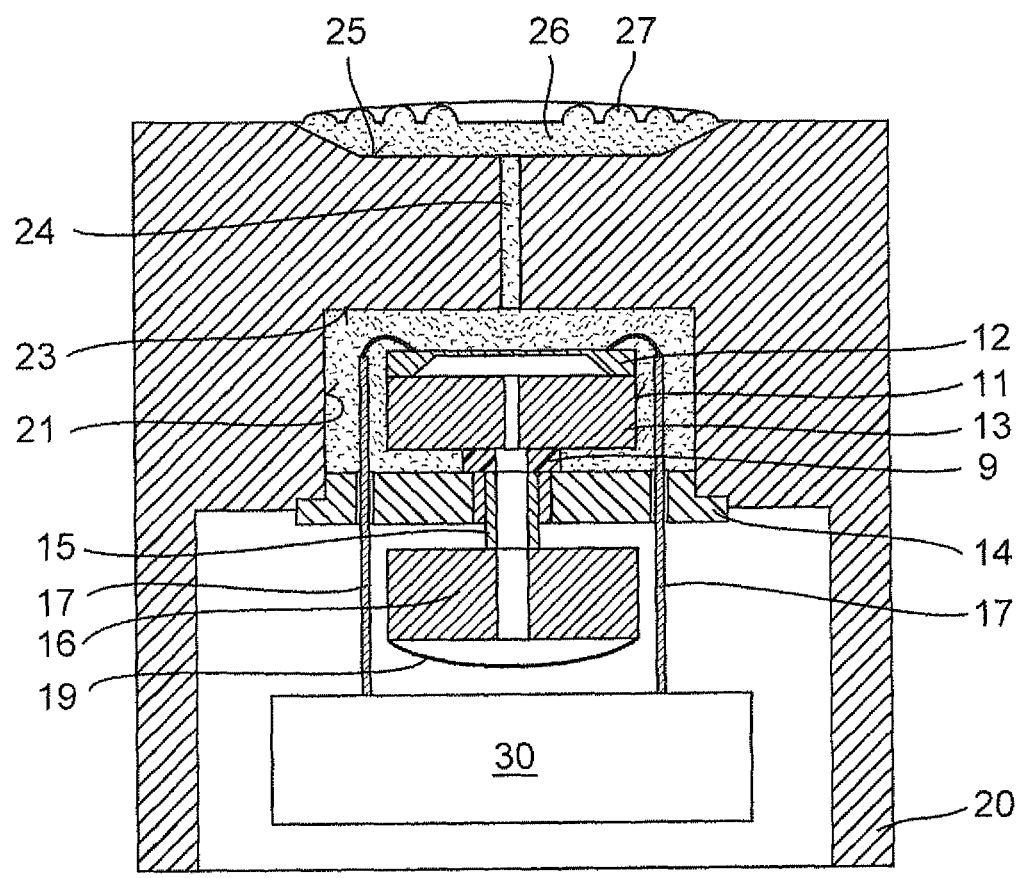
FIG. 3 is a longitudinal section through an example of an embodiment of a relative pressure sensor of the invention.

FIG. 3 shows schematically how the pressure measuring transducer of FIG. 2 is arranged in a sensor outer body, in order to complete the relative pressure sensor of the invention. Besides the pressure transducer 11, the relative pressure sensor includes a sensor outer body 20, in which a transducer chamber 21 is formed. Extending from an outer surface 22 of the sensor outer body 20 facing away from the transducer chamber 21 to an end face 23 of the transducer chamber 21 is a pressure supply line 24. The pressure supply line preferably meets requirements for a flame penetration barrier. Formed on the outer surface 22 is a diaphragm bed 25, which is sealed by an isolating diaphragm 27 to form a pressure introduction chamber 26, wherein the edge of the isolating diaphragm 27 is pressure-tightly welded to the outer surface 22. The pressure measuring transducer 11 is inserted with a silicon chip 12 at the front into the transducer chamber 21, wherein the support body 14 is pressure-tightly connected with the sensor outer body 20 via hard soldering or welding. The remaining free volume in the transducer chamber 21, in the pressure supply line 24 and in the pressure introduction chamber 26 is filled with a pressure transfer liquid, especially a pressure transfer oil, in order to transfer a pressure acting on the isolating diaphragm 27 to the measuring membrane of the pressure measuring transducer. The deflections of the measuring membrane of the pressure measuring transducer depend on the difference between the introduced media pressure and atmospheric pressure introduced through the foil 19 into the sealed section of the reference pressure path. The piezoresistive resistance elements (not shown) of the semiconductor chip 12 are connected via contact pads and bond wires with the electrical feedthroughs 17, which, in turn, are connected to a processing circuit 30, by which the resistance elements are fed.

By limiting the sealed section of the reference pressure path to a very short region between the semiconductor chip 12 and the processing circuit 30, the volume of this section is small, so that the required volume stroke of a metallized plastic foil can be provided, without corrupting the atmospheric pressure introduced into the sealed section of the reference pressure path. In this way, the pressure bearing adhesion 9 between the platform 13 and the support body 14 is effectively protected against moisture, without degrading the pressure measurement.

The contacting of the transducer circuit can occur, for example, in the manner presented in patent application 10 2009 001133. Also, the filling element presented there can be provided in the transducer chamber, in order to minimize the remaining oil volume. The representation of the contacting means and the filling element is omitted in the present application for purposes of perspicuity.

The invention claimed is:

1. A relative pressure sensor, comprising:
a pressure measuring transducer, having a measuring membrane of a semiconductor chip;
a platform, wherein between said measuring membrane and said platform, a reference pressure chamber is formed, a support body, wherein said platform is connected with said support body by means of a pressure-bearing adhesion; and
a sensor outer body, in which a transducer chamber is formed, said transducer chamber has a first opening and a second opening, wherein said pressure measuring transducer is brought into said transducer chamber through said first opening, and is held in said transducer chamber by means of said support body, said support body pressure-tightly seals said first opening, wherein:
a reference pressure path extends through said platform and said support body, in order to introduce reference pressure into said reference pressure chamber;
a side of said measuring membrane facing away from said reference pressure chamber is contactable with the media pressure through said second opening, characterized in that the reference pressure path has a gas-filled, sealed section, which extends from said reference pressure chamber at least through said pressure bearing adhesion; and
said sealed section is gas-tightly sealed by means of a flexible, metallized plastic foil.

2. The relative pressure sensor as claimed in claim 1, wherein:
said gas-filled, sealed section extends at least through said support body.

3. The relative pressure sensor as claimed in claim 1, wherein:
said gas-filled, sealed section has a small tube, which is secured to said support body.

4. The relative pressure sensor as claimed in claim 3, wherein:
said plastic foil is gas-tightly connected with said small tube along a peripheral sealing surface; and
said peripheral sealing surface surrounds an area, which is larger than the cross sectional area of said small tube.

5. The relative pressure sensor as claimed in claim 4, wherein:
said small tube has on its end facing away from the reference pressure chamber an end surface, whose surface normal is tilted relative to the longitudinal axis of said small tube.

6. The relative pressure sensor as claimed in claim 3, wherein:
a shape-retaining foil bearing body connects to said small tube;
said gas-filled, sealed section of the reference pressure path extends through said shape-retaining foil bearing body;

said plastic foil is gas-tightly connected along a peripheral sealing surface with said small tube; and said peripheral sealing surface surrounds an area, which is larger than the cross sectional area of said small tube.

7. The relative pressure sensor as claimed in claim 1, wherein:

said first opening of said transducer chamber has an inner cross sectional area $A_1$; and said sealed section of the reference pressure path between said measuring membrane and said foil has a length L, wherein: $L/(A_1/\pi)^{1/2}<4$, preferably $L/(A_1/\pi)^{1/2}<3$.

8. The relative pressure sensor as claimed in claim 1, wherein:

said first opening of said transducer chamber has an inner cross sectional area $A_1$;

the perpendicular projection of said foil on the cross sectional area $A_1$ forms a projection surface $A_2$, wherein: $A_2/A_1<1$, especially $A_2/A_1<0.8$.

9. The relative pressure sensor as claimed in claim 1, wherein:

said pressure measuring transducer is a (piezo-)resistive pressure measuring transducer having at least two resistance elements or a capacitive pressure measuring transducer having at least two electrodes;

the relative pressure sensor has furthermore an electronic circuit, whose inputs are connected to the resistance elements or to the electrodes of said pressure measuring transducer; and the sealed section of the reference pressure path is spatially arranged between said pressure measuring transducer and said electronic circuit.

\* \* \* \* \*